(12) United States Patent
Miyazaki et al.

(10) Patent No.: US 8,140,460 B2
(45) Date of Patent: Mar. 20, 2012

(54) CHARACTER OUTFIT AUTOCONFIGURATION DEVICE, CHARACTER OUTFIT AUTOCONFIGURATION METHOD, AND CHARACTER OUTFIT AUTOCONFIGURATION PROGRAM

(75) Inventors: Seiya Miyazaki, Kanagawa (JP); Sachiko Uranaka, Tokyo (JP); Makoto Yasugi, Kanagawa (JP); Toshiyuki Tanaka, Osaka (JP); Koichi Emura, Kanagawa (JP); Hiroyuki Suzuki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 608 days.

(21) Appl. No.: 12/302,866

(22) PCT Filed: May 21, 2007

(86) PCT No.: PCT/JP2007/060365
§ 371 (c)(1),
(2), (4) Date: Jan. 9, 2009

(87) PCT Pub. No.: WO2007/138911
PCT Pub. Date: Dec. 6, 2007

(65) Prior Publication Data
US 2010/0010951 A1    Jan. 14, 2010

(30) Foreign Application Priority Data
May 30, 2006    (JP) .................. 2006-150364

(51) Int. Cl.
G06F 17/00    (2006.01)
G06N 5/02    (2006.01)
(52) U.S. Cl. ......................................................... 706/47
(58) Field of Classification Search .................... 706/46, 706/47
See application file for complete search history.

(56) References Cited

U.S. PATENT DOCUMENTS

| 2008/0165194 A1* | 7/2008 | Uranaka et al. ............... 345/473 |
| 2009/0033666 A1* | 2/2009 | Yasugi et al. ................. 345/473 |

FOREIGN PATENT DOCUMENTS

| JP | 8-123976 A | 5/1996 |
| JP | 8-263681 A | 10/1996 |
| JP | 9-153145 A | 6/1997 |
| JP | 11-346267 A | 12/1999 |
| JP | 2001-167287 A | 6/2001 |
| JP | 2003-346173 A | 12/2003 |

OTHER PUBLICATIONS

English language Abstract of JP 2001-167287 A.
English language Abstract of JP 2003-346173 A.
English language Abstract of JP 11-346267 A.
Terasaki et al. "Object Shiko ni Yoru Dosa Data no Kanri Shuho to Shizen Gengo Kara no Animation Seisei System," Visual Computing Graphics and CAD Godo Symposium 2004 Yokoshu, Jun. 3, 2004, pp. 197-202.
U.S. Appl. No. 11/916,899 to Yasugi et al., filed Dec. 7, 2007.

* cited by examiner

*Primary Examiner* — Alan Chen
*Assistant Examiner* — Ababacar Seck
(74) *Attorney, Agent, or Firm* — Greenblum & Bernstein, P.L.C.

(57) ABSTRACT

Provided is a character outfit autoconfiguration device capable of configuring outfit for a character matched with a content of a scenario without requiring specification of outfit by a user or using user environment information. The character outfit autoconfiguration device (300) for configuring outfit of a character from a scenario includes: a scenario dividing unit (320) for dividing the scenario into sections according to continuity of outfit of the character, and outfit autoconfiguration unit (350) for configuring outfit of the character according to a content of a scenario section for each of the scenario sections divided by the scenario dividing unit.

11 Claims, 17 Drawing Sheets

| ITEM | VOCABULARY |
|---|---|
| Outfit specification | "tuxedo" "white coat" |
| Action | "sleep" "swim" "ski" "have dinner" "stay" |
| Person | "Maggie" "Ms. Margaret" "company president" "parents-in-law" "Hanako" "Nozomi" "Taro" |
| Emotion | "sad" "Aha!" "excited" |
| Purpose | "swimming at the beach" "job interview" |
| Adjective | "spectacular" "wonderful" |
| Location | "Japanese inn" "beach" "ski resort" "restaurant" "hotel" |
| Time | "this summer" "in the Jomon era" "at night" |
| Weather | "hot" "rain" |
| Pictogram | "🥾" |

FIG.3

| SCENE | DIRECTION | ITEM | ITEM VALUE |
|---|---|---|---|
| Scene 1 | Direction 1 | Location | ski resort |
| | Direction 2 | Subject | Hanako |
| | | Action | ski |
| | Direction 3 | Subject | Hanako |
| | | Emotion | excited |
| Scene 2 | Direction 1 | Location | Japanese inn |
| | Direction 2 | Time | night |
| | Direction 3 | Subject | Hanako, Nozomi |
| | | Action | have dinner |
| Scene 3 | Direction 1 | Location | Japanese inn |
| | Direction 2 | Time | night |
| | Direction 3 | Subject | Hanako, Nozomi |
| | | Action | stay |

FIG.4

```xml
<Scenario>
 <Scene id="1">
  <Direction id="1">
   <Location>ski resort</Location>
  </Direction>
  <Direction id="2">
   <Subject>Hanako</Subject>
   <Action>ski</Action>
  </Direction>
  <Direction id="3">
   <Subject>Hanako</Subject>
   <Emotion>excited</Emotion>
  </Direction>
 </Scene>
 <Scene id=" 2 ">
  <Direction id="1">
   <Location>Japanese inn</Location>
  </Direction>
  <Direction id="2">
   <Time>night</Time>
  </Direction>
  <Direction id="3">
   <Subject>Hanako</Subject>
   <Subject>Nozomi</Subject>
   <Action>have dinner</Action>
  </Direction>
 </Scene>
 <Scene id=" 3 ">
  <Direction id="1">
   <Location>Japanese inn</Location>
  </Direction>
  <Direction id="2">
   <Time>night</Time>
  </Direction>
  <Direction id="3">
   <Subject>Hanako</Subject>
   <Subject>Nozomi</Subject>
   <Action>stay</Action>
  </Direction>
 </Scene>
</Scenario>
```

FIG.5

| ID | OUTFIT CONTINUITY INFERENCE RULE |
|---|---|
| ID1 | Outfit is set on a character-by-character basis |
| ID2 | The outfit of characters does not change when the direction gets one step ahead within a scene |
| ID3 | When the scene changes but the location and time do not change, the outfit of the previous scene is continued |

FIG.6

| SCENARIO SECTION 322 | SUBJECT 323 | ITEM 324 | ITEM VALUE 325 | |
|---|---|---|---|---|
| Scenario section 1 (Scene 1) | Hanako | Location | ski resort | } 326-1 |
| | | Action | ski | |
| | | Emotion | excited | |
| Scenario section 2 (Scene 2) | Hanako | Location | Japanese inn | } 326-2 |
| | | Action | have dinner | |
| | Nozomi | Location | Japanese inn | } 326-3 |
| | | Action | have dinner | |
| Scenario section 2 (Scene 3) | Hanako | Location | Japanese inn | } 326-4 |
| | | Action | stay | |
| | Nozomi | Location | Japanese inn | } 326-5 |
| | | Action | stay | |

FIG.7

| | 332 | 333 | 334 |
|---|---|---|---|
| 331 | NAME | OUTFIT | CHARACTER DATA |
| | Hanako | default | Hana.cg |
| | Hanako | skiwear | Hana_skiwear.cg |
| | Hanako | yukata | Hana_yukata.cg |
| | Hanako | street clothes | Hana_street.cg |
| | Nozomi | default | Nozomi.cg |
| | Nozomi | yukata | Nozomi_yukata.cg |
| | Nozomi | street clothes | Nozomi_street.cg |
| | Taro | default | Taro.cg |
| | Taro | tuxedo | Taro_tuxedo.cg |
| | .... | .... | .... |

FIG.8

| ID | METAKNOWLEDGE |
|---|---|
| 1 | Employ strict rule result of conditions connected by AND |
| 2 | Continue previous outfit |
| 3 | Use following priority order for items: Outfit specification > Action > Purpose > Location > Subject > Other party > Emotion > Adjective > Time > Weather > Pictogram |
| 4 | Apply priority in rule ID order |

FIG.10

| SCENE | DIRECTION | ITEM | ITEM VALUE |
|---|---|---|---|
| Scene 1 | Direction 1 | Location | ski resort |
| | Direction 2 | Subject | Hana_skiwear.cg |
| | | Action | ski |
| | Direction 3 | Subject | Hana_skiwear.cg |
| | | Emotion | excited |
| Scene 2 | Direction 1 | Location | Japanese inn |
| | Direction 2 | Time | night |
| | Direction 3 | Subject | Hana_yukata.cg, Nozomi_yukata.cg |
| | | Action | have dinner |
| Scene 3 | Direction 1 | Location | Japanese inn |
| | Direction 2 | Time | night |
| | Direction 3 | Subject | Hana_yukata.cg, Nozomi_yukata.cg |
| | | Action | stay |

FIG.11

CHARACTER OUTFIT AUTOCONFIGURATION DEVICE, CHARACTER OUTFIT AUTOCONFIGURATION METHOD, AND CHARACTER OUTFIT AUTOCONFIGURATION PROGRAM

TECHNICAL FIELD

The present invention relates to a character outfit autoconfiguration apparatus, character outfit autoconfiguration method, and character outfit autoconfiguration program that configure outfit of a character appearing in a scenario from the scenario.

BACKGROUND ART

Nowadays, e-mail, chats, blogs, and so forth have become well established as everyday means of communication. More particularly, in recent years there has been an increase in applications and services that enable the exchange of messages containing playful elements, with text decorated with still-image or moving-image (animation) CG (Computer Graphics), in addition to text-only messages.

Examples of such applications and services include a mail application that freely combines image templates and mail templates in a mobile phone, and transmits decorated mail, an application that distinguishes a specific pictogram or character string contained in received mail, and displays CG animation on a reception screen, a service that transmits a message together with a bodily movement, gesture, or facial expression of a character by means of a simple key operation, and so forth.

Also, to enable easy original creation of a character used for communication purposes, the technologies described in Patent Document 1 and Patent Document 2 employ a method whereby a character used for communication purposes is created by simple operations of selecting and combining character outfit and feature parts.

Furthermore, to enable animation for communication use to be given greater realism without the need for onerous operations, the technology described in Patent Document 3 employs a method whereby the outfit of an avatar (character representing the user) attached to mail is configured using user environment information (such as location, weather, time, and so forth).

Patent Document 1: Japanese Patent Application Laid-Open No. 2001-167287
Patent Document 2: Japanese Patent Application Laid-Open No. 2003-346173
Patent Document 3: Japanese Patent Application Laid-Open No. HEI 11-346267

DISCLOSURE OF INVENTION

Problems to be Solved by the Invention

Animation for decorating text of e-mail, chats, blogs, and so forth, such as described above, must relate to the content of a message. In particular, it is desirable for the outfit of a character appearing in animation to be easily inferred from the content of a message.

However, none of the technologies described in the above Patent Documents takes any account whatever of text written by a user in configuring the outfit of a character.

With the technologies described in Patent Document 1 and Patent Document 2, a user explicitly selects character outfit via a character property selection screen. However, with this method, when text content is a scenario having a story line, displaying a character matching that content requires character outfit to be re-selected each time there is a change of scene in the story, which is inconvenient.

Also, with the technology described in Patent Document 3, although onerous operations can be avoided since character outfit is selected automatically using user environment information, this method lacks versatility since it cannot handle a scenario whose content is unrelated to the surrounding environment of a message creator.

It is an object of the present invention to provide a character outfit autoconfiguration apparatus, character outfit autoconfiguration method, and character outfit autoconfiguration program that enable character outfit matching the content of a scenario to be configured without using a user-provided outfit specification or user environment information.

Means for Solving the Problems

A character outfit autoconfiguration apparatus of the present invention employs a configuration having, in a character outfit autoconfiguration apparatus that configures outfit of a character from a scenario, a scenario sectionalizing section that sectionalizes the scenario based on continuity of outfit of the character, and an outfit autoconfiguration section that configures outfit of the character for each scenario section of a scenario sectionalized by the scenario sectionalizing section based on content of the scenario section.

A character outfit autoconfiguration method has, in a character outfit autoconfiguration method that configures outfit of a character from a scenario, a scenario sectionalizing step of sectionalizing the scenario based on continuity of outfit of the character, and an outfit autoconfiguration step of configuring outfit of the character for each scenario section of a scenario sectionalized by the scenario sectionalizing step based on content of the scenario section.

A character outfit autoconfiguration program of the present invention causes a computer to execute, in a character outfit autoconfiguration program for causing a computer to execute processing that configures outfit of a character from a scenario, scenario sectionalizing processing that sectionalizes the scenario based on continuity of outfit of the character, and outfit autoconfiguration processing that configures outfit of the character for each scenario section of a scenario sectionalized by the scenario sectionalizing processing based on content of the scenario section.

ADVANTAGEOUS EFFECT OF THE INVENTION

According to the present invention, character outfit matching the content of an input scenario can be configured without using a user-provided outfit specification or user environment information.

BRIEF DESCRIPTION OF DRAWINGS

FIG. 3 is a drawing showing an example of a semantic dictionary table stored in the semantic dictionary database in FIG. 1;

FIG. 4 is a drawing showing an example of a scenario generated by the scenario generating section in FIG. 1;

FIG. 5 is a drawing showing an example of a data configuration of the scenario in FIG. 4;

FIG. 6 is a drawing showing an example of an outfit continuity inference rule table stored in the outfit continuity inference rule database in FIG. 1;

FIG. 7 is a drawing showing an example of a scenario sectionalized in outfit continuity units by the scenario sectionalizing section in FIG. 1;

FIG. 8 is a drawing showing an example of a character data table stored in the character database in FIG. 1;

FIG. 10 is a drawing showing an example of a second outfit autoconfiguration rule table stored in the outfit autoconfiguration rule database in FIG. 1;

FIG. 11 is a drawing showing an example of a scenario rewritten by the scenario rewriting section in FIG. 1;

BEST MODE FOR CARRYING OUT THE INVENTION

An embodiment of the present invention will now be described in detail with reference to the accompanying drawings.

Figure 1:
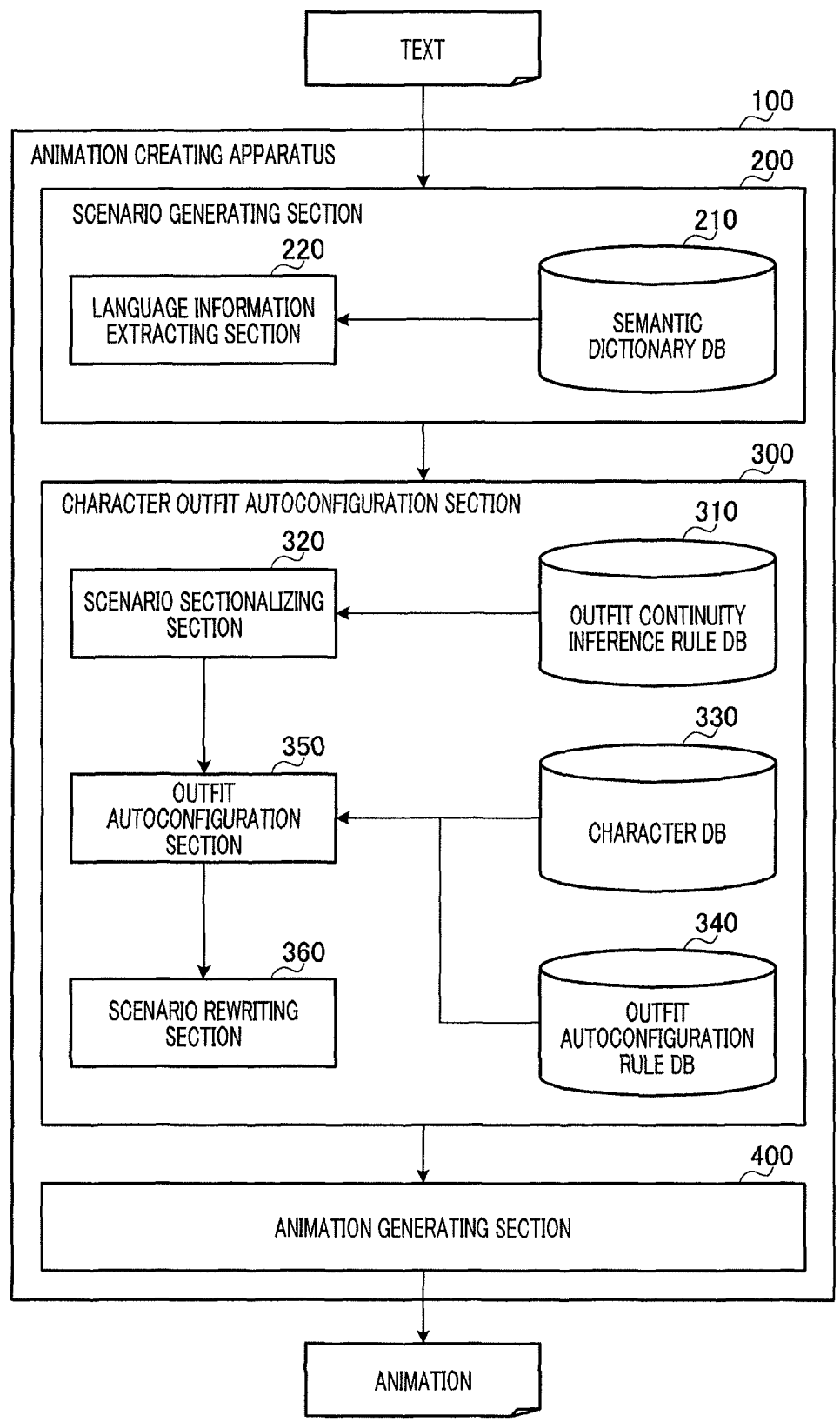
FIG. 1 is a block diagram showing the configuration of an animation creating apparatus in which a character outfit autoconfiguration apparatus according to an embodiment of the present invention is installed.

FIG. 1 is a block diagram showing the configuration of an animation creating apparatus in which a character outfit autoconfiguration apparatus according to an embodiment of the present invention is installed.

Animation creating apparatus 100 shown in FIG. 1 has a function of configuring animation based on text, and is broadly divided into scenario generating section 200, character outfit autoconfiguration section 300, and animation generating section 400. Scenario generating section 200 has semantic dictionary database 210 and language information extracting section 220. Character outfit autoconfiguration section 300 has outfit continuity inference rule database 310, scenario sectionalizing section 320, character database 330, outfit autoconfiguration rule database 340, outfit autoconfiguration section 350, and scenario rewriting section 360.

Animation creating apparatus 100 is a system that has text as input, and generates and outputs actual animation based on the content of that text or animation information corresponding one-to-one to animation (such as text, for example).

Items that are necessary in order to display animation are information as to what character, background, and small articles are used, and a scenario indicating how a character acts in a time sequence and where a character, etc., is placed. Here, the type of animation is not particularly limited. For example, animation may be two-dimensional animation such as Flash (registered trademark), or three-dimensional CG animation using known technology such as OpenGL (registered trademark) or DirectX (registered trademark) Also, animation may be displayed as a plurality of still images presented in line with a story, such as a 4-panel cartoon strip, or by flipping through a plurality of still images in line with a story, as with cutoff animation. Furthermore, animation content is not particularly limited here, either. Animation need only have at least one character appear (for example, animation with only an avatar whose outfit changes).

However, as stated above, information input to the system is text only. Thus, in order to generate animation from text, an animation creating apparatus of this embodiment is generally provided with a scenario generating section that generates an animation scenario from text, a character autoconfiguration section that configures a character that appears in the animation based on the scenario, and an animation generating section that generates animation based on these items of information. Furthermore, animation creating apparatus 100 according to this embodiment has a function that configures outfit of a character appearing in animation by means of character outfit autoconfiguration section 300 when generating animation from text. To be more specific, animation creating apparatus 100 according to this embodiment has a function that configures outfit of a character in animation based on information (for example, an outfit specification, action, subject (name), other party, emotion, adjective, pictogram, location, purpose, time, weather, and so forth) obtained from input text. Here, "outfit" is used in a broad sense to include clothes, accessories, small articles, and the like.

As stated above, it is desirable for the outfit of a character appearing in animation to be easily inferred from the content of a message. For example, on reading the text "Today, I've been practicing kendo since this morning", most people will probably visualize a scene in which a character wearing a kendo outfit is practicing kendo. This is because they think it is reasonable that the character is wearing a kendo outfit from the language information representing the action of "practicing kendo". Similarly, a character wearing a T-shirt may be visualized based on the text "This summer is hot", and many people would visualize a character wearing swimwear based on the text "I'm at the pool". This is because language information representing "hot" weather and language information representing the location "pool" are associated with wearing a T-shirt and wearing swimwear respectively. In this way, text contains numerous items of language information with a high probability of configuring the outfit of a character. Thus, in this embodiment, by providing semantic dictionary database 210 and language information extracting section 220 in scenario generating section 200, and newly providing character outfit autoconfiguration section 300, provision is made for the outfit of a character appearing in animation to be configured automatically so as to match text content using a scenario obtained from input text.

In this embodiment, the description refers to a mobile phone by way of example, but the present invention is not limited to this. An animation creating apparatus in which a character outfit autoconfiguration apparatus according to the present invention is installed can also be applied in a similar way to various kinds of hardware, such as a PC (Personal Computer), PDA (Personal Digital Assistants), video camera, or electronic book, for example. Also, the present invention is not limited to e-mail software alone, but can also be applied in a similar way to various kinds of application software and services, such as chat software, web bulletin boards, SNS (Social Network Services), blogs (weblogs), and journal creation tools.

Animation creating apparatus 100 may be incorporated, for example, in the mail creation/display function of a mobile phone. In this case, a mobile phone has a function whereby a user creates mail, a function that inputs text of created mail to animation creating apparatus 100, and a function that displays and stores animation that is the output result of animation creating apparatus 100. These functions are initiated by user key operations. Furthermore, a mobile phone also has a function that inputs text of received mail to animation creating apparatus 100, and a function that displays and stores animation that is the output result of animation creating apparatus 100. This makes it possible to display text content as animation not only for text one has written the user oneself, but also for text written by another person.

Before describing the configuration of animation creating apparatus 100 in detail, text input to animation creating apparatus 100 will first be described.

Figure 2:
FIG. 2 is a drawing showing examples of text.

FIG. 2 is a drawing showing examples of text.

FIG. 2 shows examples of text in four different genres: mail, mobile phone mail, blog, and journal. The content of many texts for communication use is composed of one's own or another party's actions, feelings, setting (scene), and so forth. This embodiment, also, handles text having this kind of composition. This embodiment can also be applied to a movie or theater scenario, book, magazine, newspaper article, and so forth, in addition to the above examples.

Returning to FIG. 1, the configuration of animation creating apparatus 100 will now be described in detail.

Scenario generating section 200 has text as input, generates an animation scenario by means of natural language analysis processing or the like, and outputs this animation scenario. In natural language analysis processing, analysis is generally performed in the following order: morphological analysis, syntactic analysis, semantic analysis. A known scenario generation method is to complement a result of semantic analysis with information such as subject, action, or location. Natural language analysis and animation scenario generation are described in detail in R. C. Shank, C. K. Riesbeck, Shun Ishizaki (Transl.), "Introduction to Natural Language Analysis", Soken, pp. 224-258, for example, and therefore a detailed description thereof is omitted here.

Semantic dictionary database 210 stores a semantic dictionary table for generating a scenario by extracting language information necessary in terms of configuring character outfit in particular. A semantic dictionary table is composed of sets of items and corresponding vocabulary.

FIG. 3 is a drawing showing an example of a semantic dictionary table stored in semantic dictionary database 210.

In semantic dictionary table 211 shown in FIG. 3, vocabulary 213 is recorded associated with items 212 serving as keys. In FIG. 3, items 212 comprise, as values, "Outfit specification" indicating a character outfit specification, "Action" indicating an action of a character, "Person" indicating the name of a character, "Emotion" indicating an emotion of a character, "Purpose" indicating a purpose of a character action, "Adjective" indicating an adjectival representation of a scene, "Location" indicating a location of a scene, "Time" indicating a time of a scene, "Weather" indicating weather of a scene, and "Pictogram" indicating a pictogram within text. Items 212 of semantic dictionary table 211 need not comprise all of these items, but must comprise at least one of these items.

In vocabulary 213, at least one item of vocabulary is recorded for each item 212. For instance, in the example shown in FIG. 3, "tuxedo" and "white coat" are recorded as vocabulary 213 corresponding to item 212 "Outfit specification".

Language information extracting section 220 performs text matching to input text (see FIG. 2) with vocabulary contained in semantic dictionary table 211 (see FIG. 3) stored in semantic dictionary database 210, extracts relevant vocabulary 213 and corresponding item 212 as language information, generates a scenario based on the obtained language information (vocabulary 213 and item 212), and outputs this scenario. For item 212 "Person", a scenario is generated with the item 212 value changed to either "subject" or "other party" according to the text content by means of natural language processing. For example, if vocabulary item 213 appears in text as "subjective case", the item 212 value for representing the subjective case is changed to "subject", and if vocabulary item 213 appears in text as "indirect objective case", the item 212 value for representing the objective case is changed to "other party". Finally, a scenario generated by scenario generating section 200 is output to character outfit autoconfiguration section 300.

FIG. 4 is a drawing showing an example of a scenario generated by scenario generating section 200.

Scenario 230 shown in FIG. 4 is composed of a plurality of scenes 231. Scenes 231 are animation scenario units, generally indicating animation in the same time period and in the same location. Animations corresponding to scenes 231 are played back sequentially starting from the top of scenario 230. Each scene 231 is further composed of a plurality of directions 232. Directions 232 are animation direction units, generally indicating animation at the same time. Animations corresponding to directions 232 are played back sequentially starting from the top of scenario 230. Each direction 232 is further composed of a language information item or plurality of language information items 233 and a language information item value or plurality of language information item values 234. Each item 233 indicates an item of corresponding direction 232, and its content is written in item value 234. Possible values of items 233 are, for example, "Outfit specification", "Action", "Subject", "Other party", "Emotion", "Purpose", "Adjective", "Location", "Time", "Weather", and "Pictogram". The value of item value 234 can be any character string. An item value 234 character string is configured based on the content of text relating to corresponding item 233.

FIG. 5 is a drawing showing an example of a data configuration of scenario 230 shown in FIG. 4. Scenario 230 uses an XML (eXtensible Markup Language) format data configuration, for example. Here, a value specified as "Scene id" corresponds to scene 231 in FIG. 4, and a value specified as "Direction id" corresponds to direction 232 in FIG. 4. Also, "Location", "Subject", "Action", "Emotion", and "Time" correspond respectively to "Location", "Subject", "Action", "Emotion", and "Time" among items 233 in FIG. 4, and the written character strings correspond to item values 234 in FIG. 4.

Character outfit autoconfiguration section 300 has a scenario generated by scenario generating section 200 as input, configures character data representing the material substance of a character appearing in animation using character database 330, and outputs this character data. At this time, in this embodiment, character outfit autoconfiguration section 300 sectionalizes the input scenario in outfit units using outfit continuity inference rule database 310, and furthermore configures character outfit based on the sectionalized scenario using character database 330 and outfit autoconfiguration rule database 340. Character outfit autoconfiguration section 300 outputs a clothed character as character data.

In the description of this embodiment, outfit and a character are treated as one entity, and per-outfit character data is stored in character database 330, but the present invention is not limited to this. For example, depending on the embodiment, it is also possible to treat character data and outfit data as separate data. In this case, the character outfit autoconfiguration section also references an outfit database in addition to a character database, and outputs character data and outfit data.

Also, in this embodiment an arbitrary pointer that specifies the material substance of a character, such as a filename or URL indicating a clothed character, is output as character data, but the form of output character data is not limited to this. For example, depending on the embodiment, character data constituting the material substance of a clothed character may itself be output.

Outfit continuity inference rule database 310 stores an outfit continuity inference rule table containing rules necessary for inferring continuity of outfit by means of scenario sectionalizing section 320 (hereinafter referred to as "outfit continuity inference rules"). Outfit continuity inference rules are rules for inferring how far character outfit continues, and at what timing character outfit changes, in a provided plurality of scenarios, and indicate a condition for outfit continuing. Use of such outfit continuity inference rules makes it possible to configure outfit change timing.

FIG. 6 is a drawing showing an example of an outfit continuity inference rule table stored in outfit continuity inference rule database 310.

Outfit continuity inference rule table 311 shown in FIG. 6 is composed of ID 312/outfit continuity inference rule 313 pairs. In outfit continuity inference rule 313 are written rules necessary in terms of scenario sectionalization for configuring outfit. In the example shown in FIG. 6, outfit continuity inference rule table 311 is composed of three pairs, 311-1, 311-2, and 311-3. In pair 311-1, the rule "Outfit is set on a character-by-character basis" is written as outfit continuity inference rule 313 corresponding to ID 312 "ID1". In pair 311-2, the rule "The outfit of characters does not change when the direction gets one step ahead within a scene" is written as outfit continuity inference rule 313 corresponding to ID 312 "ID2". In pair 311-3, the rule "When the scene changes but the location and time do not change, the outfit of the previous scene is continued" is written as outfit continuity inference rule 313 corresponding to ID 312 "ID3". Scenario sectionalizing is performed as to satisfy all outfit continuity inference rules 313 written in outfit continuity inference rule table 311. Outfit continuity inference rules 313 are actually written in program code that can be interpreted by a computer, but their content is shown here in natural language.

Scenario sectionalizing section 320 sectionalizes scenario 230 (see FIG. 4) in section units (hereinafter referred to as "scenario sections") in which character outfit continues using outfit continuity inference rule table 311 (see FIG. 6) stored in outfit continuity inference rule database 310. The significance of scenario sections is that character outfit is continued as specific outfit within the same scenario section, and there is a possibility of character outfit changing between different scenario sections.

FIG. 7 is a drawing showing an example of a scenario sectionalized in outfit continuity units by scenario sectionalizing section 320.

Scenario 321 shown in FIG. 7 is composed of a plurality of scenario sections 322. Scenario sections 322 are outfit-unit sections of scenario 230 shown in FIG. 4. Each scenario section 322 is composed of one or a plurality of sections 326, and each section 326 further comprises subject 323. Only a character appearing in a scene included in that scenario section is shown as subject 323. Associated with each subject 323, a sectionalized scenario is written that is necessary for configuring outfit of that character in that scenario section. The scenario is composed of items 324 and item values 325. Therefore, scenario section 322 setting is performed for each subject 323 for each scene.

In the example shown in FIG. 7, sectionalized scenario 321 is composed of two scenario sections 322. Scenario section 322 "Scenario section 1" is composed of one section 326-1 corresponding to scene 1 shown in FIG. 4. Scenario section 322 "Scenario section 2" is composed of two sections 326-2 and 326-3 corresponding to scene 2 in FIG. 4, and two sections 326-4 and 326-5 corresponding to scene 3 in FIG. 4.

As shown in FIG. 7, in scenario section 322 "Scenario section 1" a scenario for configuring the outfit of subject 323 "Hanako" is written as section 326-1. Also, in scenario section 322 "Scenario section 2" a scenario for configuring the outfit of subject 323 "Hanako" is written as sections 326-2 and 326-4, and a scenario for configuring the outfit of subject 323 "Nozomi" is written as sections 326-3 and 326-5.

Character database 330 shown in FIG. 1 stores a character data table for extracting character data with a character name/outfit pair as a key. A character data table is composed of sets of character name plus outfit plus character data.

FIG. 8 is a drawing showing an example of a character data table stored in character database 330.

Character data table 331 shown in FIG. 8 is composed of character name 332 and outfit 333 serving as key, and corresponding character data 334. One character data 334 item is configured by one character name 332/outfit 333 pair. As an example, character data 334 here takes the form of a pointer that specifies the material substance of a character, such as a filename or URL indicating a clothed character. In the example shown in FIG. 8, in the case of character name 332 "Hanako", for outfit 333 "default", "skiwear", "yukata", and "street clothes", character data 334 "Hana.cg", "Hana_skiwear.cg", "Hana_yukata.cg", and "Hana_street.cg" are extracted respectively. Similarly, in the case of character name 332 "Nozomi", for outfit 333 "default", "yukata", and "street clothes", character data 334 "Nozomi.cg", "Nozomi_yukata.cg", and "Nozomi_street.cg" are extracted respectively. And in the case of character name 332 "Taro", character data 334 "Taro.cg" and "Taro_tuxedo.cg" are extracted respectively for outfit 333 "default" and "tuxedo".

In this embodiment the above configuration is employed because, as stated above, a clothed character is treated as one character data item. However, as stated above, depending on the embodiment, character data and outfit data may also be used in separate files, and utilized for animation by combining character data and outfit data. In this case, although a separate outfit database is necessary, the method is not greatly different, and therefore a description thereof is omitted here.

Outfit autoconfiguration rule database 340 stores a first outfit autoconfiguration rule table and second outfit autoconfiguration rule table. The first outfit autoconfiguration rule table shows a correspondence relationship between language information and outfit. In this first outfit autoconfiguration rule table, language information can be written by linking a plurality of language information items using logical symbols (for example, AND, OR, parentheses, and the like). Linking a plurality of language information items using logical symbols in this way makes it possible to process a plurality of language information items. The second outfit autoconfiguration rule table is composed of at least one metaknowledge item for resolving a contradiction or conflict. Using such metaknowledge makes it possible to configure one outfit item even if a contradiction or conflict exists by resolving that contradiction or conflict.

Figure 9:
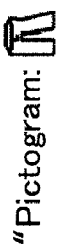
FIG. 9 is a drawing showing an example of a first outfit autoconfiguration rule table stored in the outfit autoconfiguration rule database in FIG. 1.

FIG. 9 is a drawing showing an example of a first outfit autoconfiguration rule table stored in outfit autoconfiguration rule database 340.

First outfit autoconfiguration rule table 341 shown in FIG. 9 is composed of sets of ID 342 plus character outfit 343 plus language information 344. Language information 344 is composed of an item and item value (see FIG. 4 and FIG. 7), and a plurality of item/item value pairs can be written linked by one or more logical symbols (for example, AND, OR, or parentheses).

In the example shown in FIG. 9, first outfit autoconfiguration rule table 341 is composed of nine pairs 341-1 through 341-9 having IDs 342 "1" through "9". Pair 341-1 shows that outfit 343 "skiwear" is appropriate when a language information 344 item is "Action" and the corresponding item value is "ski". Pair 341-2 shows that outfit 343 "yukata" is appropriate when a language information 344 item is "Location" and the corresponding item value is "Japanese inn". Pair 341-3 shows that outfit 343 "swimwear" is appropriate when a language information 344 item is "Action" and the corresponding item value is "swim", or when a language information 344 item is "Purpose" and the corresponding item value is "swimming at the beach", or when a language information 344 item is "Location" and the corresponding item value is "beach" and a language information 344 item is "Season" and the corresponding item value is "summer". Pair 341-4 shows that outfit 343 "tuxedo" is appropriate when a language information 344 item is "Subject" and the corresponding item value is "bridegroom". Pair 341-5 shows that outfit 343 "blue jeans" is appropriate when a language information 344 item is "Pictogram" and the corresponding item value is "(Pants Pictogram)". Pair 341-6 shows that outfit 343 "raincoat" is appropriate when a language information 344 item is "Weather" and the corresponding item value is "rain". Pair 341-7 shows that outfit 343 "suit" is appropriate when a language information 344 item is "Location" and the corresponding item value is "office", or when a language information 344 item is "Purpose" and the corresponding item value is "work", or when a language information 344 item is "Other party" and the corresponding item value is "parents-in-law". Pair 341-8 shows that outfit 343 "street clothes" is appropriate when a language information 344 item is "restaurant", "hotel", or "Japanese inn". And pair 341-9 shows that outfit 343 "pajamas" is appropriate when a language information 344 item is "Location" and the corresponding item value is "home", and a language information 344 item is "Time" and the corresponding item value is "night".

FIG. 10 is a drawing showing an example of a second outfit autoconfiguration rule table stored in outfit autoconfiguration rule database 340.

Second outfit autoconfiguration rule table 345 shown in FIG. 10 is composed of ID 346/metaknowledge 347 pairs. Metaknowledge 347 is knowledge of how a rule is implemented, comprising knowledge rules showing how a contradiction or conflict is to be resolved. In the example shown in FIG. 10, second outfit autoconfiguration rule table 345 is composed of four pairs 345-1 through 345-4 having IDs 346 "1" through "4". In pair 345-1, metaknowledge 347 "Employ strict rule result of conditions connected by AND" is written. In pair 345-2, metaknowledge 347 "Continue previous outfit" is written. In pair 345-3, metaknowledge 347 "Use following priority order for items: Outfit specification>Action>Purpose>Location>Subject>Other party>Emotion>Adjective>Time>Weather>Pictogram" is written. In pair 345-4, metaknowledge 347 "Apply priority in rule ID order" is written. Metaknowledge 347 is actually written in program code that can be interpreted by a computer, but its content is shown here in natural language.

Outfit autoconfiguration section 350 configures character outfit based on a sectionalized scenario (see FIG. 7) using character data table 331 (see FIG. 8) stored in character database 330, and first outfit autoconfiguration rule table 341 (see FIG. 9) and second outfit autoconfiguration rule table 345 (see FIG. 10) stored in outfit autoconfiguration rule database 340, and outputs character-with-outfit data.

Using character-with-outfit data output from outfit autoconfiguration section 350, scenario rewriting section 360 performs rewriting of the scenario input from scenario generating section 200. Specifically, in the input scenario, scenario rewriting section 360 rewrites item value 234 corresponding to item 233 "Subject" as character-with-outfit data configured by outfit autoconfiguration section 350.

FIG. 11 is a drawing showing an example of a scenario rewritten by scenario rewriting section 360. Post-rewrite scenario 370 shown in FIG. 11 is composed by rewriting pre-rewrite scenario 230 shown in FIG. 4 so that item value 234 for direction 232-2 "Hanako" is rewritten as character-with-outfit data (pointer format) "Hana_skiwear.cg", item value 234 for direction 232-3 "Hanako" is rewritten as character-with-outfit data (pointer format) "Hana_skiwear.cg", and item value 234 for direction 232-9 "Hanako" is rewritten as character-with-outfit data (pointer format) "Hana_yukata.cg".

In this embodiment, scenario rewriting section 360 is provided in character outfit autoconfiguration section 300, but the present invention is not limited to this. For example, depending on the embodiment, instead of scenario rewriting section 360 being provided in character outfit autoconfiguration section 300, character-with-outfit data output from outfit autoconfiguration section 350 of character outfit autoconfiguration section 300 may be sent directly to animation generating section 400. In this case, a scenario output by scenario generating section 200 is output not only to character outfit autoconfiguration section 300 but also to animation generating section 400.

Animation generating section 400 generates animation using at least a post-rewrite scenario—that is, a scenario containing character-with-outfit data (see FIG. 11). That is to say, animation generating section 400 configures a character's placement and action based on a post-rewrite scenario, and generates and outputs animation as two-dimensional animation or three-dimensional animation, adding camerawork, lighting, deformation-type staging, BGM, sound effects, and so forth, if necessary. As explained above, depending on the embodiment it is also possible to generate animation using a scenario from scenario generating section 200 and character-with-outfit data from outfit autoconfiguration section 350 of character outfit autoconfiguration section 300.

Figure 12A:
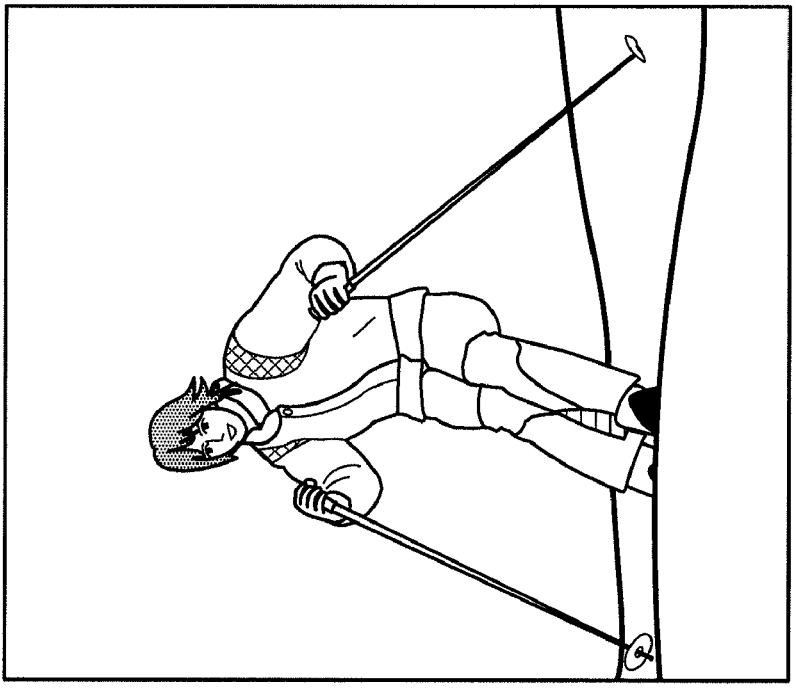
FIG. 12 is a drawing showing examples of animation generated by the animation generating section in FIG. 1.
Figure 12B:
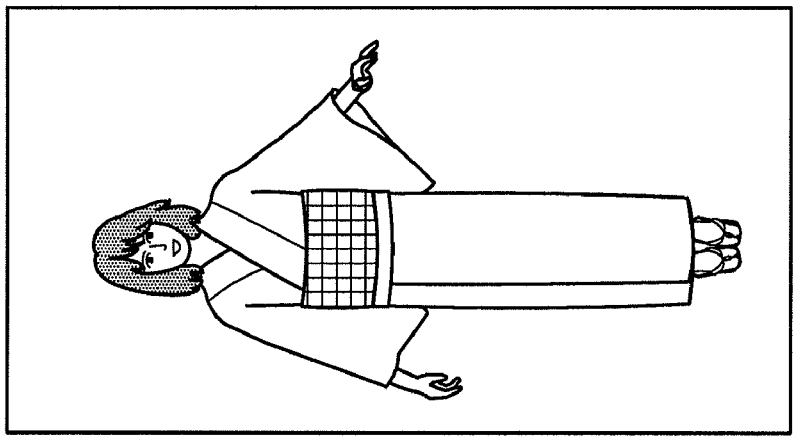
Figure 12C:
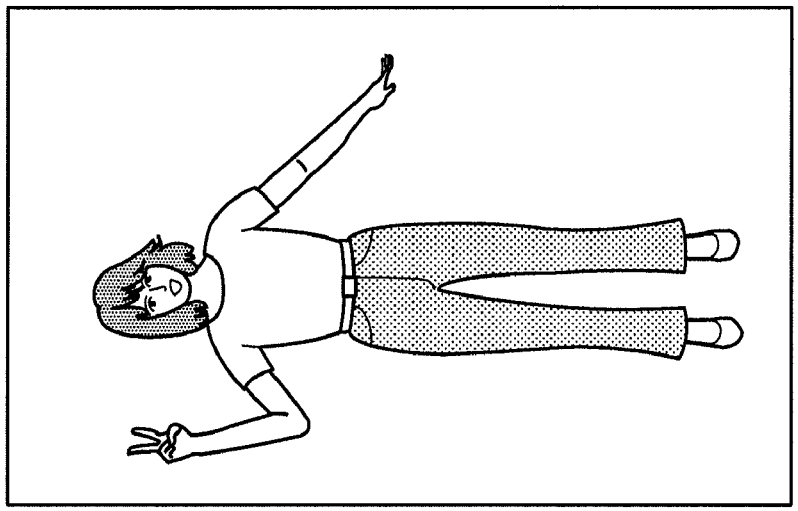

FIG. 12 is a drawing showing examples of animation generated by animation generating section 400. The animation examples shown in FIG. 12A, FIG. 12B, and FIG. 12C are actually moving images, one shot of which is shown here as a still image.

FIG. 12A is a shot of Hanako skiing, wearing skiwear, and corresponds to "direction 2" of "scene 1" (direction 232-2) in post-rewrite scenario 370 shown in FIG. 11. FIG. 12B is a shot of Hanako wearing a yukata, and corresponds to "direction 3" of "scene 2" (direction 232-6) and "direction 3" of "scene 3" (direction 232-9) in post-rewrite scenario 370 shown in FIG. 11. FIG. 12C is a shot of Hanako wearing blue jeans and making a "peace" sign, and corresponds to the result of processing text "I bought (Pants Pictogram) (Peace Sign Pictogram)!" in genre "Mobile phone mail" shown in FIG. 2.

Although not shown in the drawings, animation creating apparatus 100 has a CPU (Central Processing Unit) and memory such as ROM (Read Only Memory) and RAM (Random Access Memory). For example, ROM holds a control program and RAM is working memory. The functions of the sections shown in FIG. 1 are implemented by having the CPU execute a control program.

An above-described mobile phone is provided with a communication circuit as existing hardware, and animation information generated by animation creating apparatus 100 can be transmitted to another mobile phone, a personal computer, or suchlike communication device via a mobile phone network. In addition, an above-described mobile phone can receive text, a scenario, or animation information transmitted from another mobile phone or a base station via a communication network.

The operation of animation creating apparatus 100 having the above configuration will now be described using the flowcharts shown in FIG. 13 through FIG. 17. The flowcharts shown in FIG. 13 through FIG. 17 are stored in animation creating apparatus 100 ROM as a control program that is executed by the CPU.

Figure 13:
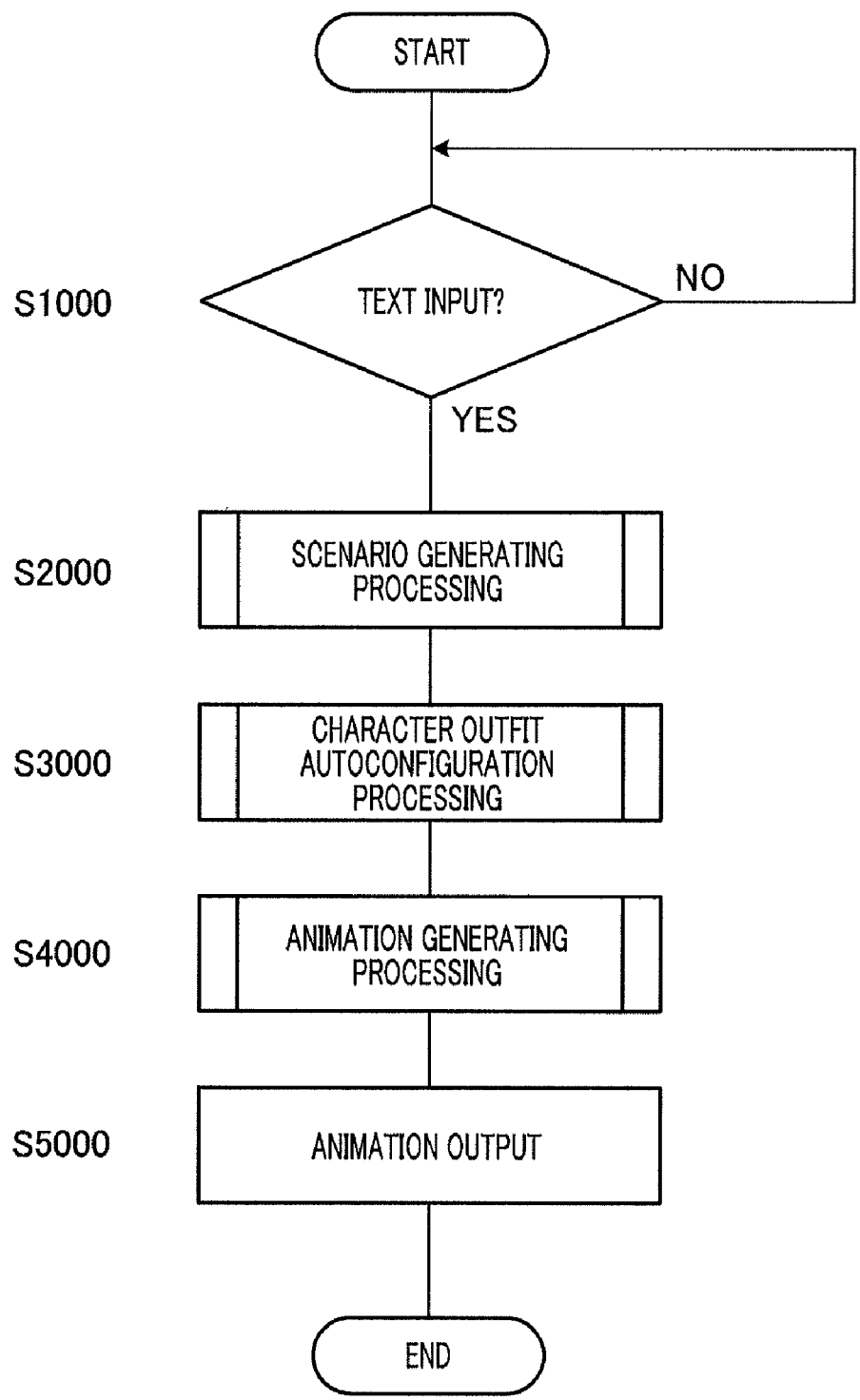
FIG. 13 is a flowchart showing the operation of the animation creating apparatus in FIG. 1.

FIG. 13 is a flowchart showing the operation of animation creating apparatus 100 shown in FIG. 1.

First, in step S1000, scenario generating section 200 determines whether or not text has been input. Text is input, for example, by means of a mobile phone operation by the user or reception from outside via a communication network. When text is input, the start of animation creation is directed by a mobile phone operation by the user. If it is determined that text has been input (S1000: YES), the processing flow proceeds to step S2000, and if it is determined that text has not been input (S1000: NO), scenario generating section 200 waits until text is input.

In step S2000, scenario generating section 200 executes scenario generating processing. Specifically, text is input, an animation scenario is generated from the input text by means of natural language analysis processing or the like, and is output. This scenario generating processing will be described later herein.

Then, in step S3000, character outfit autoconfiguration section 300 executes character outfit autoconfiguration processing. Specifically, the scenario generated in step S2000 is input, character-with-outfit data representing the material substance of a character appearing in animation is configured using outfit continuity inference rule database 310, character database 330, and outfit autoconfiguration rule database 340, and is output. This character outfit autoconfiguration processing will be described later herein.

Next, in step S4000, animation generating section 400 executes animation generating processing. Specifically, animation is generated based on the scenario generated in step S2000 and the character-with-outfit data configured in step S3000. This animation generating processing will be described later herein. There are no restrictions on the animation file format here. The animation file format may be of any kind, not only a moving image format such as MPEG (Moving Picture Experts Group) or AVI (Audio Video Interleaving), but also a data format or script language format for CG animation, a flash animation format, and so forth.

Then, in step S5000, animation generating section 400 outputs the animation generated in step S4000.

Although not shown in the drawings, a mobile phone equipped with animation creating apparatus 100 has a display section that displays animation output from that animation creating apparatus 100. Furthermore, a communicating party of the mobile phone equipped with animation creating apparatus 100 also has a similar apparatus. Therefore, transmitting this animation to the communicating party enables the communicating-party user to view animation corresponding to the content of text input by the user of the mobile phone equipped with animation creating apparatus 100.

Figure 14:
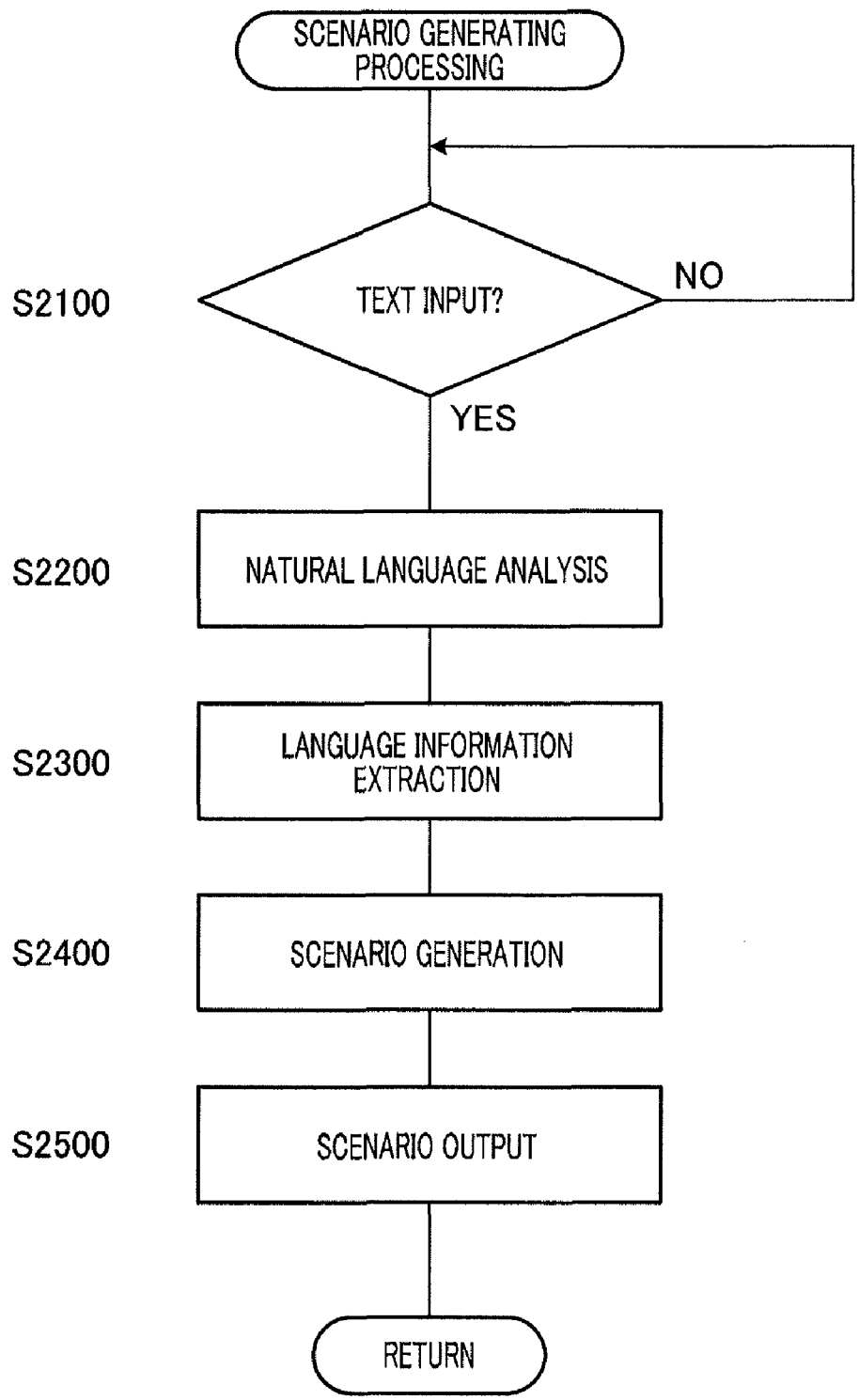
FIG. 14 is a flowchart showing the content of scenario generating processing (step S2000) in FIG. 13.

FIG. 14 is a flowchart showing the content of scenario generating processing (step S2000) in FIG. 13. This scenario generating processing is executed by scenario generating section 200.

First, in step S2100, scenario generating section 200 determines whether or not text input to animation creating apparatus 100 (see FIG. 2) has been input. If it is determined that text has been input (S2100: YES), the processing flow proceeds to step S2200, and if it is determined that text has not been input (S2100: NO), scenario generating section 200 waits until text is input.

In step S2200, morphological analysis, syntactic analysis, and semantic analysis are executed sequentially as natural language analysis of the input text, and the analysis result is output.

Then, in step S2300, language information extracting section 220 performs text matching to the step S2200 analysis result with vocabulary contained in semantic dictionary table 211 (see FIG. 3) stored in semantic dictionary database 210, extracts relevant vocabulary 213 and corresponding item 212 as language information, generates a scenario based on the obtained language information (vocabulary 213 and item 212), and outputs this scenario.

Next, in step S2400, an animation scenario (see FIG. 4) matching the content of the input text is generated based on the step S2200 analysis result and the scenario extracted in step S2300.

Then, in step S2500, the scenario generated in step S2400 is output to character outfit autoconfiguration section 300, after which the processing flow returns to the flowchart in FIG. 13.

For example, by means of this kind of processing, scenario 230 in FIG. 4 is generated from "Mail" genre text ("We are going to go skiing at Niseko ski resort tomorrow. I'm so excited. I will have dinner with Nozomi at a Japanese inn at night. We will also stay there.") shown in FIG. 2. The mail text in FIG. 2 comprises four sentences, and contains "ski resort" as vocabulary indicating location, "go skiing" as morphemes indicating action, "excited" as vocabulary indicating emotion, "night" as vocabulary indicating time, "Japanese inn" as vocabulary indicating location, and "will have dinner" and "will . . . stay" as morphemes indicating action.

Scenario 230 generated from this text is first sectionalized into three scenes: up to and including the second sentence, the third sentence, and the fourth sentence. First scene 1 is composed of three directions, 232-1 through 232-3. That is to say, first scene 1 is composed of direction 1 (direction 232-1) indicating that "Location" is "ski resort", direction 2 (direction 232-2) indicating that "Action" is "ski", and direction 3 (direction 232-3) indicating that "Emotion" is "excited". Second scene 2 is composed of three directions, 232-4 through 232-6. That is to say, second scene 2 is composed of direction 1 (direction 232-4) indicating that "Location" is "Japanese inn", direction 2 (direction 232-5) indicating that "Time" is "night", and direction 3 (direction 232-6) indicating that "Action" is "have dinner". Third scene 3 is composed of three directions, 232-7 through 232-9. That is to say, third scene 3 is composed of direction 1 (direction 232-7) indicating that "Location" is "Japanese inn", direction 2 (direction 232-8)

indicating that "Time" is "night", and direction 3 (direction 232-9) indicating that "Action" is "stay". A character (avatar) indicating the mobile phone user is recorded beforehand in animation creating apparatus 100. If there is no subject in text, scenario generating section 200 sets a recorded character name as the subject. This is to handle the characteristic of frequent omission of the subject when this is the user himself/ herself writing the text, especially in text for communication use. In the example of scenario 230 shown in FIG. 4, "Hanako" is set as the subject of direction 2 and direction 3 on scene 1, and based on the content of scenario 230, "Nozomi" is additionally set as a subject of direction 3 of scene 2 and direction 3 of scene 3.

Figure 15:
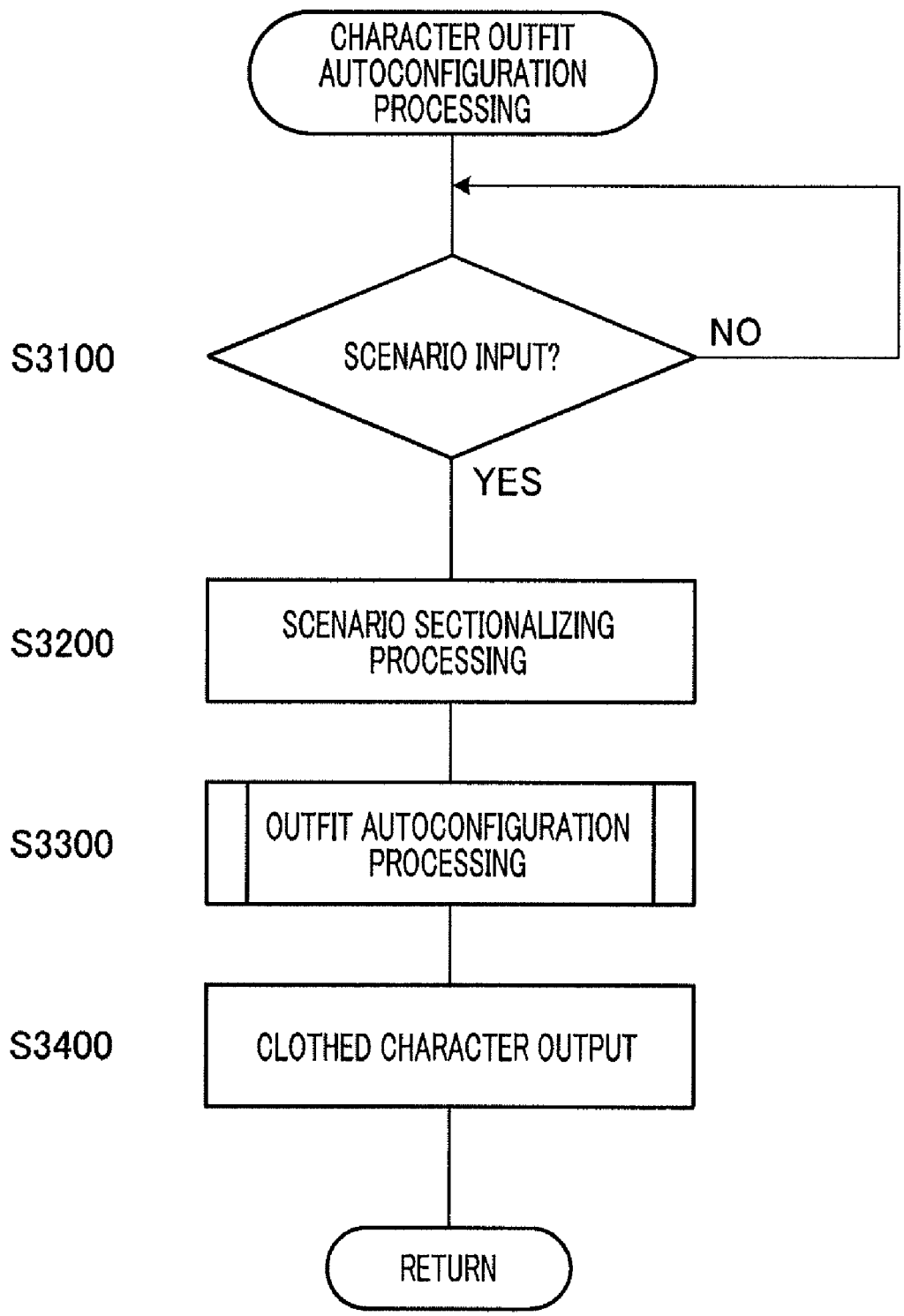
FIG. 15 is a flowchart showing the content of character outfit autoconfiguration processing (step S3000) in FIG. 13.

FIG. 15 is a flowchart showing the content of character outfit autoconfiguration processing (step S3000) in FIG. 13. This character outfit autoconfiguration processing is executed by character outfit autoconfiguration section 300.

First, in step S3100, character outfit autoconfiguration section 300 determines whether or not a scenario generated by scenario generating section 200 (see FIG. 4) has been input. If it is determined that a scenario has been input (S3100: YES), the processing flow proceeds to step S3200, and if it is determined that a scenario has not been input (S3100: NO), character outfit autoconfiguration section 300 waits until a scenario is input.

In step S3200, scenario sectionalizing section 320 configures sections (scenario sections) in which character outfit continues so as to satisfy all outfit continuity inference rules 313 written in outfit continuity inference rule table 311 (see FIG. 6) stored in outfit continuity inference rule database 310. Then scenario sectionalizing section 320 sectionalizes scenario 230 shown in FIG. 4 based on the configured sections, generates sectionalized scenario 321 shown in FIG. 7, and outputs this to outfit autoconfiguration section 350.

As an example, the processing procedure is shown below for the case in which sectionalized scenario 321 shown in FIG. 7 is created from scenario 230 shown in FIG. 4.

Scenario sectionalizing section 320 first stores input scenario 230 in memory (not shown). Then scenario sectionalizing section 320 scans scenario 230 from top to bottom in accordance with "ID1" outfit continuity inference rule 313 (pair 311-1) of outfit continuity inference rule table 311, and creates a table for each character appearing in scenario 230.

In this example, "Hanako" and "Nozomi" exist as values 234 for which item 233 is "Subject", and therefore two tables (not shown)—a "Hanako" table and a "Nozomi" table—are created.

Next, scenario sectionalizing section 320 again scans scenario 230 from top to bottom, and inputs scenario sectionalizing section 320 direction items and values in order to the respective tables. At this time, if the scenario sectionalizing section 320 scene is the same but the directions differ, input continues to be performed to the same table in accordance with "ID2" outfit continuity inference rule 313 (pair 311-2). Also, if the scenario sectionalizing section 320 location or time changes from the previous scene, the table is divided in accordance with "ID3" outfit continuity inference rule 313 (pair 311-3), and a direction item and value are input to a new table from the relevant scene onward.

In this example, first, direction 232-1 "ski resort", direction 232-2 "ski", and direction 232-3 "excited" are input to the same "Hanako" table. Then, because the location changes from "ski resort" to "Japanese inn" in direction 232-4, the "Hanako" table is divided, and direction 232-4 "Japanese inn", direction 232-5 "night", and direction 232-6 "stay" belonging to the same scene are input to the next table. Direction 232-7 "Japanese inn" and direction 232-8 "night" belonging to the next same scene belong to a different scene from direction 232-6, but because the time and location do not change for directions 232-4 through 232-6, the "Hanako" table is not divided, and input continues to be performed to the same table. Processing for "Nozomi" is performed in a similar way.

Then, when table creation is completed for all of scenario 230, scenario sectionalizing section 320 integrates the created tables to create sectionalized scenario 321 shown in FIG. 7. Specifically, scenario sectionalizing section 320 makes tables generated for each character into one integrated scenario section corresponding to the same scene, and rearranges scenario sections and direction items and values in line with the original scenario 230 order.

As a result, scenario 321 sectionalized into two scenario sections 322 is obtained, as shown in FIG. 7. In sectionalized scenario 321, scene 2 and scene 3 are integrated into one scenario section. That is to say, it is configured that scene 2 and scene 3 comprise a section in which character outfit continues. Sectionalized scenario 321 is output to outfit autoconfiguration section 350.

Next, in step S3300, outfit autoconfiguration section 350 executes outfit autoconfiguration processing for each scenario section. Specifically, character outfit is configured based on a sectionalized scenario (see FIG. 7) using character data table 331 (see FIG. 8) stored in character database 330, and first outfit autoconfiguration rule table 341 (see FIG. 9) and second outfit autoconfiguration rule table 345 (see FIG. 10) stored in outfit autoconfiguration rule database 340, and character-with-outfit data is output. This outfit autoconfiguration processing will be described in detail later herein.

Then, in step S3400, scenario rewriting section 360 performs rewriting of the scenario input to character outfit autoconfiguration section 300 using the character-with-outfit data configured in step S3300, and the rewritten scenario (containing clothed characters) is output, after which the processing flow returns to the flowchart in FIG. 13. Specifically, item value 234 corresponding to item 233 "Subject" is rewritten as character-with-outfit data configured in step S3300, and a post-rewrite scenario is output.

Figure 16:
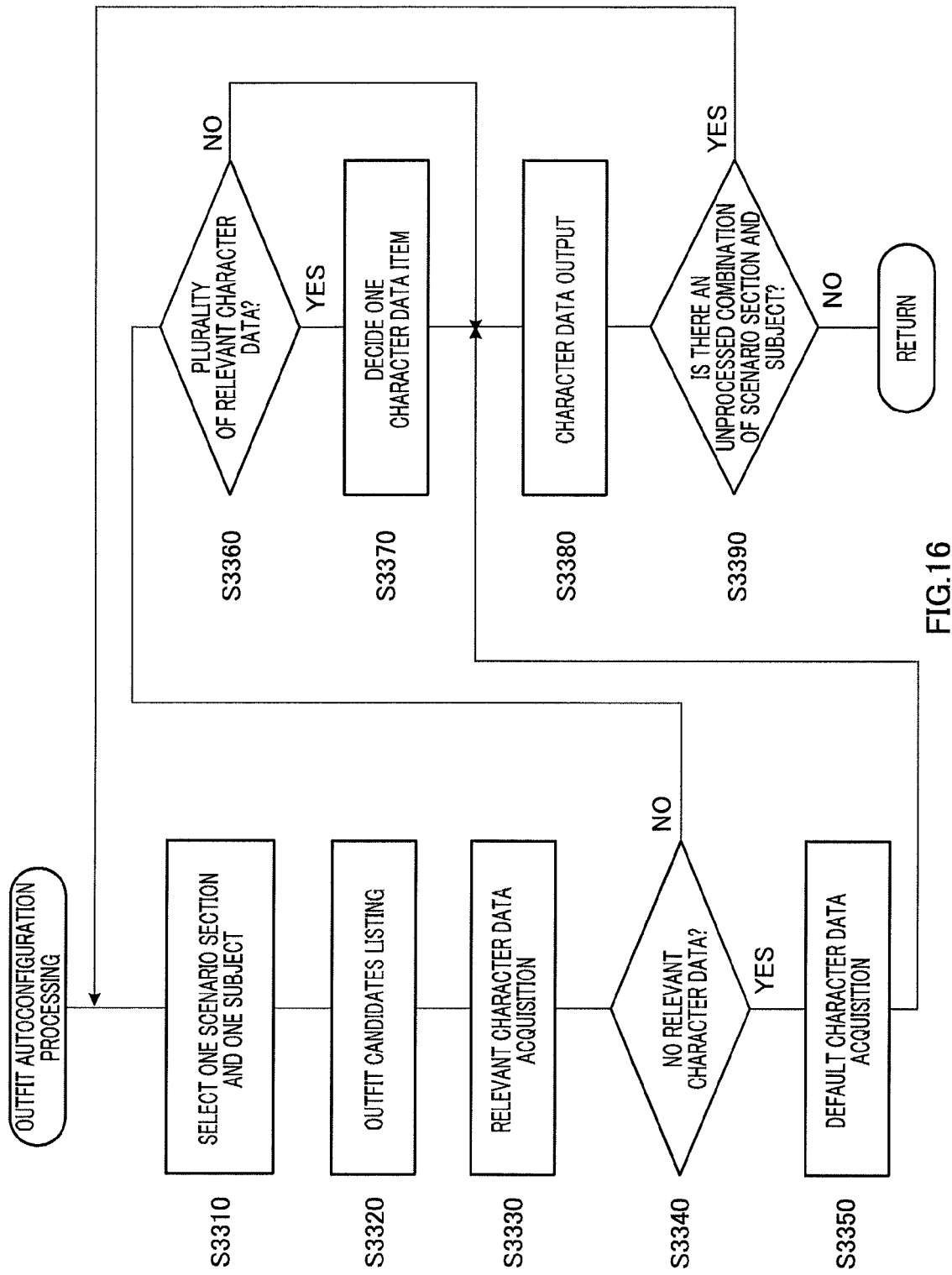
FIG. 16 is a flowchart showing the content of outfit autoconfiguration processing (step S3300) in FIG. 15.

FIG. 16 is a flowchart showing the content of outfit autoconfiguration processing (step S3300) in FIG. 15. This outfit autoconfiguration processing is executed by outfit autoconfiguration section 350.

First, in step S3310, outfit autoconfiguration section 350 selects, from among the scenario sections composing the scenario sectionalized in step S3200 in FIG. 15 (see FIG. 7) and the subjects contained in those scenario sections, one for which character data configuration and output have not been completed.

In step S3320, outfit candidates are listed from the input sectionalized scenario using first outfit autoconfiguration rule table 341 (see FIG. 9) stored in outfit autoconfiguration rule database 340.

Next, in step S3330, character data table 331 (see FIG. 8) stored in character database 330 is searched using a subject 323 name in sectionalized scenario 321 and outfit candidates listed in step S3320 as keys, and relevant character data 334 is acquired.

Then, in step S3340, it is determined whether or not there is not a single item of relevant character data 334 as the processing result of step S3330. If it is determined that there is not a single item of relevant character data 334 (S3340: YES), the processing flow proceeds to step S3350, and if it is determined that there is one or more item of relevant character data 334 (S3340: NO), the processing flow proceeds to step S3360.

In step S3350, since relevant character data could not be acquired with the given subject 323 name and outfit, character data corresponding to default outfit is searched for. In the search, character data table 331 is searched using only a subject 323 name as a key, and after character data 334 for which outfit 333 is "default" is acquired, the processing flow proceeds to step S3380. It is assumed that character database 330 provides for character data 334 for which outfit 333 is "default" to be acquired when a search is executed with only a subject 323 name as a key. Furthermore, it is assumed that arbitrary character data 334 is extracted if relevant character data 334 cannot be obtained when a search is executed with only a subject 323 name as a key.

In step S3360, it is further determined whether or not there is a plurality of relevant character data 334 as the processing result of step S3330. If it is determined that there is a plurality of relevant character data 334 (S3360: YES), the processing flow proceeds to step S3370, and if it is determined that there is only one item of relevant character data 334 (S3360: NO), the processing flow proceeds to step S3380.

In step S3370, in order to narrow down the plurality of relevant character data 334 to one, metaknowledge 347 written in second outfit autoconfiguration rule table 345 (see FIG. 10) stored in outfit autoconfiguration rule database 340 is applied one item at a time in ID 346 order, and one character data 334 item is configured.

Specifically, first, ID 346 "ID1" metaknowledge 347 is applied, and narrowing down of character data 334 is attempted. If character data is not narrowed down to one as a result of this application, the next ID 346 "ID2" metaknowledge 347 is applied. Metaknowledge 347 is continues to be applied successively in a similar way until character data is narrowed down to one.

In step S3380, unique character data 334 obtained in step S3330, step S3350, or step S3370 is output.

In step S3390, it is determined whether or not an unprocessed combination of scenario section and subject remains. If it is determined that an unprocessed combination of scenario section and subject remains (S3390: YES), the processing flow returns to step S3310, and if it is determined that processing has been completed for all combinations of scenario section and subject (S3390: NO), the processing flow returns to the flowchart in FIG. 15. As a result, the series of processing steps in step S3320 through step S3380 is performed for each scenario section and each subject of sectionalized scenario 321, and therefore the number of character data 334 output from outfit autoconfiguration section 350 finally becomes equal to the number of combinations of scenario section and subject in scenario 321.

For example, in the case of "Scenario section 1" of scenario 321 shown in FIG. 7, only pair 341-1 corresponds to language information 344 written in outfit autoconfiguration rule table 341 in FIG. 9. Therefore, only corresponding outfit "skiwear" is extracted as a "Hanako" outfit 343 candidate and character data is narrowed down to the single item "Hana_skiwear.cg", and therefore character data "Hana_skiwear.cg" is output.

On the other hand, in the case of "Scenario section 2", the second scenario section, to consider only subject "Hanako", two pairs—pair 341-2 and pair 341-8—correspond to language information 344 written in outfit autoconfiguration rule table 341 in FIG. 9. That is to say, there are two relevant character data: "Hana_yukata.cg" corresponding to "yukata" and "Hana_street.cg" corresponding to "street clothes". Therefore, first, ID 346 "ID1" metaknowledge 347 of second outfit autoconfiguration rule table 345 shown in FIG. 10 is applied. However, since neither pair 341-2 nor pair 341-8 contains AND, next ID 346 "ID2" metaknowledge 347 is applied. However, since previous outfit "skiwear" is not included in the choices, next ID 346 "ID3" metaknowledge 347 is applied. However, since pair 341-2 and pair 341-8 are both only language information relating to "Location/", next ID 346 "ID4" metaknowledge 347 is applied. As a result, only outfit "yukata" corresponding to pair 341-2 with a high rule ID priority is extracted, and character data "Hana_yukata.cg" is output.

That is to say, in each scenario section there is only one extracted character data 334 item, and "skiwear" and "yukata" respectively are finally output.

If continuity of outfit is not taken into consideration, there is a possibility of outfit "street clothes" being configured for scene 2 of scenario 230 shown in FIG. 4. If a person simply stops by at a Japanese inn for a meal, street clothes are appropriate as character outfit. However, if a person stays at the inn after dinner, a yukata is more appropriate than street clothes. Thus, taking continuity of outfit into consideration makes it possible to configure more appropriate outfit.

If "Location: Japanese inn" and "Action: swim" happen to be present in the same scenario section of a sectionalized scenario, in step S3320 two outfit candidates, "yukata" and "swimwear", are obtained from pair 341-2 and pair 341-4 of first outfit autoconfiguration rule table 341. In this case, since there is a plurality of relevant character data 334, metaknowledge 347 items written in second outfit autoconfiguration rule table 345 are applied one by one.

Specifically, metaknowledge 347 written in pair 345-1 is "Employ strict rule result of conditions connected by AND", and in this case, since pair 341-2 and pair 341-3 of first outfit autoconfiguration rule table 341 are comparable conditions, the next metaknowledge 347 is applied. Metaknowledge 347 written in next pair 345-2 is "Continue previous outfit"; and in this case, since there is no previous outfit, the next metaknowledge 347 is likewise applied. Metaknowledge 347 written in next pair 345-3 is "Use following priority order for items: Outfit specification>Action>Purpose>Location>Subject>Other party>Emotion>Adjective>Time>Weather>Pictogram", and since "Action" is described as being of higher priority than "Location", language information 344 "Action: swim" is applied here, and outfit 343 is configured as "swimwear". If narrowing down to one happened not to be achieved here, provision is made for metaknowledge 347 "Apply priority in rule ID order" written in last pair 345-4 to be applied, so that narrowing down to one can always be achieved.

Figure 17:
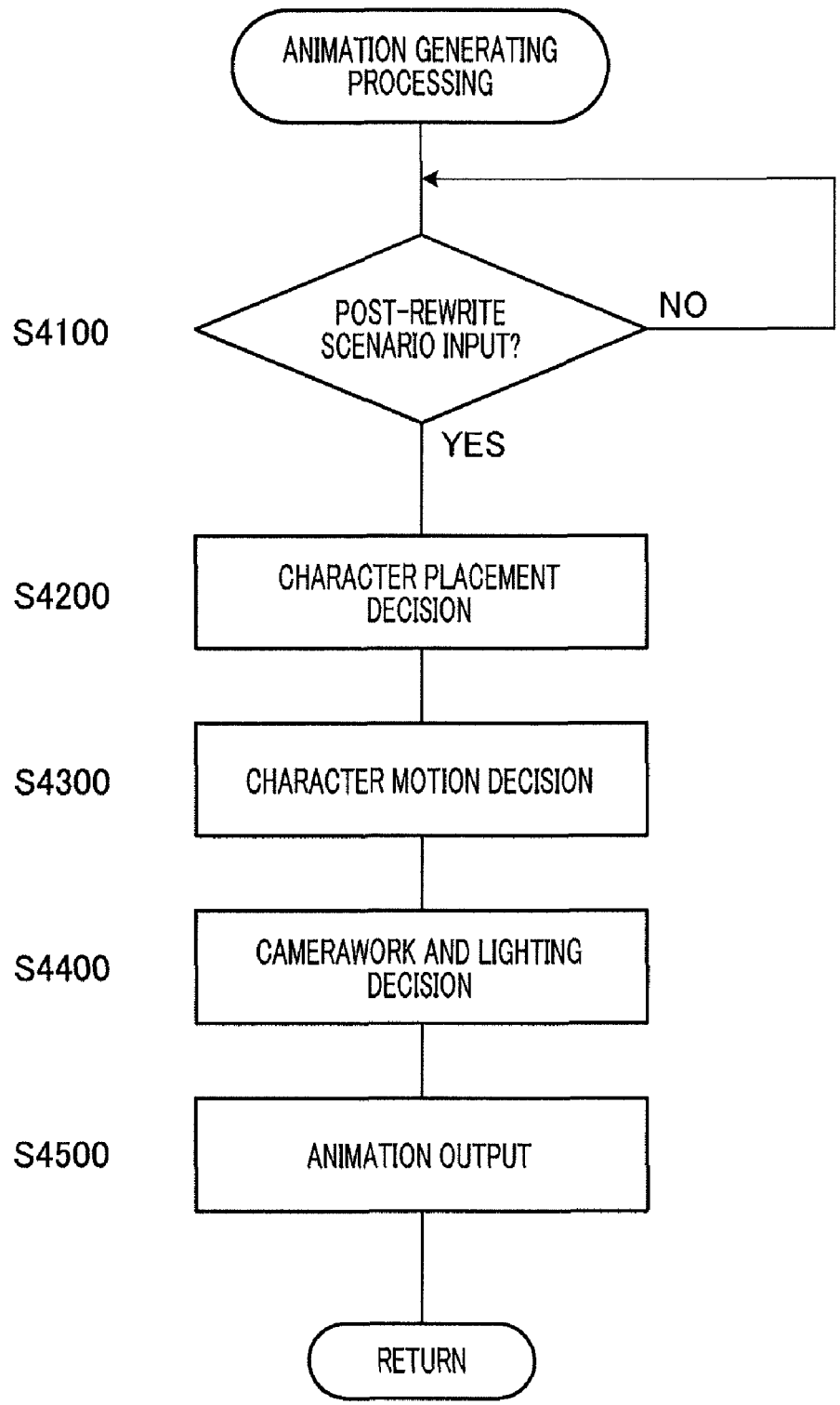
FIG. 17 is a flowchart showing the content of animation generating processing (step S4000) in FIG. 13.

FIG. 17 is a flowchart showing the content of animation generating processing (step S4000) in FIG. 13. This animation generating processing is executed by animation generating section 400. The actual content of the processing in step S4200 through step S4500 is described in detail in Japanese Patent Application Laid-Open No. 2005-44181, for example, and therefore a detailed description thereof is omitted here.

First, in step S4100, animation generating section 400 determines whether or not a post-rewrite scenario (containing character-with-outfit data) (see FIG. 11) output in step S3400 has been input. If it is determined that a post-rewrite scenario has been input (S4100: YES), the processing flow proceeds to step S4200, and if it is determined that a post-rewrite scenario has not been input (S4100: NO), animation generating section 400 waits until a post-rewrite scenario is input.

In step S4200, character placement is configured based on a location and/or subject action of input post-rewrite scenario 370. "Location" includes actual coordinates and/or attitude. The simplest way of configuring character placement is, for example, to reference a database that stores in advance where a character should be placed for each combination of location and action.

Next, in step S4300, character motion is configured based on an action of a subject of input post-rewrite scenario 370. "Motion" includes actual posture form, timing, and time. The simplest way of configuring character posture is, for example, to reference a database providing a one-to-one correspondence between actions and motions.

Then, in step S4400, staging, such as camerawork and lighting, is configured based on a location and/or subject action of input post-rewrite scenario 370. The simplest way of configuring staging is, for example, to reference a database providing a one-to-one correspondence between actions and staging.

Next, in step S4500, animation is output that is composed of a character contained in the input scenario, together with placement information, motion information, and staging information configured in step S4200 through step S4400 respectively.

Thus, according to this embodiment, a scenario is extracted from input text using semantic dictionary database 210, the scenario is sectionalized in outfit continuity units using outfit continuity inference rule database 310, and character outfit is configured based on the sectionalized scenario using character database 330 and outfit autoconfiguration rule database 340. Therefore, character outfit matching the content of input text—that is, the content of a generated scenario—can be configured without using a user-provided outfit specification or user environment information.

Specifically, a scenario necessary in terms of configuring character outfit based on text is extracted by using a semantic dictionary, the scenario is sectionalized in outfit continuity units by using outfit continuity inference rules, and character outfit is configured based on the sectionalized scenario by using a character database and outfit autoconfiguration rules.

For example, it is possible for a character to be displayed wearing swimwear if the words "am swimming" are contained in text, and for a character to be displayed wearing a suit if the words "have arrived at the interview room" are contained in text. By this means, character outfit that matches scenario content can be configured automatically without using a user-provided outfit specification or user environment information.

Also, if there is a large amount of message content and a scenario becomes long, generated animation is composed of a plurality of actions and/or a plurality of persons, and a plurality of scenes. In such a case, important points for configuring character outfit are how to process a plurality of language information items, how to resolve contradictions or conflicts, and how far outfit is continued and at what timing it is changed.

In this regard, the provision of outfit continuity inference rule database 310 according to this embodiment makes it possible to determine how far outfit is continued and at what timing it is changed. Also, the provision of outfit continuity inference rule database 310 containing first outfit autoconfiguration rule table 341 and second outfit autoconfiguration rule table 345 enables a plurality of language information items to be processed, and also enables any contradiction or conflict that may arise to be resolved and one outfit choice to be configured.

Also, if there is little information in a sectionalized scenario in a standard section for an outfit decision (such as a direction) in a scenario, there is a possibility of outfit being configured that is inappropriate for the content of the scenario.

In this regard, according to this embodiment a plurality of sections in which outfit is continued are treated as one entity and outfit can be configured based on a greater amount of information, enabling outfit that is more appropriate for the content of the scenario to be configured.

In this embodiment, a case has been described in which an outfit continuity inference rule is applied so that a scenario section is composed of one or a plurality of scenes, but the present invention is not limited to this. An outfit continuity inference rule may also be applied so that a scenario section is composed of other unit such as a direction or the like. For example, an outfit continuity inference rule may be applied so that an interval from partway through one scene to partway through another scene becomes one scenario section.

Also, outfit with a playful touch, for example, can be configured by rewriting the first outfit autoconfiguration rule table shown in FIG. 9 (e.g. "swimwear→'Action: ski'", "tuxedo→'Action: swim'", etc.).

Furthermore, a plurality of kinds of outfit continuity inference rule tables, first outfit autoconfiguration rule tables, second outfit autoconfiguration rule tables, character data tables, and suchlike tables may be provided, and switching among these may be performed according to the kind of original text or a user's inclination. This makes it possible to configure character outfit that better matches the content of a scenario, or character outfit in line with a user's inclination.

Also, in this embodiment a case has been described by way of example in which an animation creating apparatus in which a character outfit autoconfiguration apparatus according to the present invention is installed is applied to a mobile phone, but the present invention is not limited to this, and can also be applied in a similar way to various kinds of hardware, application software, and services that compose animation.

A character outfit information generating apparatus according to one aspect of the present invention employs a configuration having, in a character outfit information generating apparatus that automatically generates outfit of a character based on language information obtained from input text: an outfit continuity inference rule storing section that stores an outfit continuity inference rule for inferring continuity of outfit; a language information sectionalizing section that references the outfit continuity inference rule storing section and sectionalizes language information for configuring outfit of a character; an outfit autoconfiguration rule storing section that stores a first outfit autoconfiguration rule indicating a relationship between the language information and outfit; and an outfit autoconfiguration section that references the outfit autoconfiguration rule storing section and configures outfit of a character based on language information sectionalized by the language information sectionalizing section.

A character outfit information generating method according to another aspect of the present invention has, in a character outfit information generating method that automatically generates outfit of a character based on language information obtained from input text: a language information sectionalizing step of referencing an outfit continuity inference rule storing section that stores an outfit continuity inference rule for inferring continuity of outfit, and sectionalizing language information for configuring outfit of a character; and an outfit autoconfiguration step of referencing an outfit autoconfiguration rule storing section that stores a first outfit autoconfiguration rule indicating a relationship between the language information and outfit, and configuring outfit of a character based on language information sectionalized in the language information sectionalizing step.

A character outfit information generating program according to yet another aspect of the present invention causes a computer to execute, in a character outfit information generating program that automatically generates outfit of a character based on language information obtained from input text: a language information sectionalizing step of referencing an outfit continuity inference rule storing section that stores an outfit continuity inference rule for inferring continuity of outfit, and sectionalizing language information for configuring outfit of a character; and an outfit autoconfiguration step of referencing an outfit autoconfiguration rule storing section that stores a first outfit autoconfiguration rule indicating a relationship between the language information and outfit, and configuring outfit of a character based on language information sectionalized in the language information sectionalizing step.

The disclosure of Japanese Patent Application No. 2006-150364, filed on May 30, 2006, including the specification, drawings and abstract, is incorporated herein by reference in its entirety.

Industrial Applicability

A character outfit autoconfiguration apparatus according to the present invention enables character outfit matching the content of a scenario to be configured without using a user-provided outfit specification or user environment information, and is suitable for use in a mobile phone or suchlike portable terminal apparatus, a personal computer, a game machine, or the like.

The invention claimed is:

1. A character outfit autoconfiguration apparatus that configures an outfit of a character from a scenario, the character outfit autoconfiguration apparatus comprising:
    a scenario sectionalizer that sectionalizes the scenario based on a continuity of outfit of the character; and
    an outfit autoconfigurator that configures the outfit of the character for each scenario section of a scenario sectionalized by the scenario sectionalizer based on a content of the scenario section.

2. The character outfit autoconfiguration apparatus according to claim 1, wherein:
    the scenario contains an item of language information and an item value indicating a content of the item; and
    the character outfit autoconfiguration apparatus further comprises:
    a semantic dictionary storage that stores a semantic dictionary composed of a pair of the item of the language information and a vocabulary; and
    a scenario generator that references the semantic dictionary, associates language information contained in text with the item, and generates the scenario.

3. The character outfit autoconfiguration apparatus according to claim 2, wherein the scenario contains as the item, at least one of: a character outfit specification, an action of a character, a name of a character, an object of an action, an emotion of a character, a purpose of a character action, an adjectival representation of a scene, a location of a scene, a time of a scene, weather of a scene, and a pictogram within text.

4. The character outfit autoconfiguration apparatus according to claim 1, further comprising an outfit continuity inference rule storage that stores an outfit continuity inference rule indicating a condition for an outfit of the character continuing,
    wherein the scenario sectionalizer references the outfit continuity inference rule, infers a section in which the outfit of the character of the scenario continues, and sectionalizes the scenario at an inferred section.

5. The character outfit autoconfiguration apparatus according to claim 1, further comprising an outfit autoconfiguration rule storage that stores a first outfit autoconfiguration rule indicating a relationship between the scenario and an outfit of the character,
    wherein the outfit autoconfigurator references the first outfit autoconfiguration rule and configures the outfit of the character.

6. The character outfit autoconfiguration apparatus according to claim 5, wherein the first outfit autoconfiguration rule is composed by linking a plurality of sets of language information using a logical symbol.

7. The character outfit autoconfiguration apparatus according to claim 5, wherein:
    the outfit autoconfiguration rule storage stores a second outfit autoconfiguration rule indicating meta-knowledge that resolves a contradiction or conflict when the first outfit autoconfiguration rule is applied; and
    the outfit autoconfigurator references the second outfit autoconfiguration rule and configures the outfit of the character.

8. The character outfit autoconfiguration apparatus according to claim 1, further comprising a character data storage that stores a character data table in which character data is associated with a name and an outfit of a character,
    wherein the outfit autoconfigurator references the character data table and extracts character data with the outfit corresponding to configured the outfit of a character.

9. The character outfit autoconfiguration apparatus according to claim 8, wherein the character data is a pointer specifying a material substance of a character.

10. A character outfit autoconfiguration method that configures an outfit of a character from a scenario, the character outfit autoconfiguration method comprising:
    sectionalizing the scenario based on a continuity of the outfit of the character; and
    configuring the outfit of the character for each scenario section of a scenario sectionalized by the sectionalizing of the scenario, based on a content of the scenario section.

11. A tangible computer readable medium that stores an executable character outfit autoconfiguration program for causing a computer to execute processing that configures an outfit of a character from a scenario, the character outfit autoconfiguration program causing the computer to execute:
    scenario sectionalizing processing that sectionalizes the scenario based on a continuity of the outfit of the character; and
    outfit autoconfiguration processing that configures the outfit of the character for each scenario section of a scenario sectionalized by the scenario sectionalizing processing, based on a content of the scenario section.

* * * * *